(12) United States Patent
Polk, Sr.

(10) Patent No.: US 8,070,471 B2
(45) Date of Patent: Dec. 6, 2011

(54) GRAVITY INJECTION OF MOLDING MATERIAL FOR COMPRESSION MOLDING AND RELATED METHODS

(75) Inventor: Dale E. Polk, Sr., Titusville, FL (US)

(73) Assignee: D & D Manufacturing, Titusville, FL (US)

( * ) Notice: Subject to any disclaimer, the term of this patent is extended or adjusted under 35 U.S.C. 154(b) by 0 days.

(21) Appl. No.: 13/052,444

(22) Filed: Mar. 21, 2011

(65) Prior Publication Data

US 2011/0171339 A1 Jul. 14, 2011

Related U.S. Application Data

(62) Division of application No. 12/123,564, filed on May 20, 2008, now Pat. No. 7,931,845.

(60) Provisional application No. 60/939,155, filed on May 21, 2007.

(51) Int. Cl.
*B29C 43/04* (2006.01)

(52) U.S. Cl. ........ 425/256; 425/565; 425/574; 425/353; 425/449

(58) Field of Classification Search .................. 425/256, 425/258, 261, 344–355, 406–423, 449, 545, 425/562, 565, 566, 574, 575, 576, 185, 186, 425/192 R, DIG. 60
See application file for complete search history.

(56) References Cited

U.S. PATENT DOCUMENTS

| | | | | |
|---|---|---|---|---|
| 2,526,797 A | * | 10/1950 | Ashbaugh | 425/576 |
| 3,247,545 A | | 4/1966 | Sullivan | |
| 4,776,782 A | | 10/1988 | Murayama et al. | 425/149 |
| 4,925,381 A | | 5/1990 | Aoki et al. | 425/145 |
| 4,943,223 A | | 7/1990 | Panaroni | 425/116 |
| 6,123,880 A | | 9/2000 | Ingram | 264/39 |
| 6,126,433 A | | 10/2000 | Svoboda | 425/557 |
| 6,347,934 B1 | | 2/2002 | Andersen et al. | 425/557 |
| 6,365,083 B1 | * | 4/2002 | Nishida | 264/261 |
| 6,440,351 B1 | | 8/2002 | Saito et al. | 264/328.7 |
| 6,478,568 B2 | | 11/2002 | Ingram | 425/297 |
| 6,508,970 B2 | | 1/2003 | Chandra | 264/272.17 |
| 6,719,551 B2 | | 4/2004 | Polk, Jr. | 426/126.1 |
| 6,869,558 B2 | | 3/2005 | Polk, Jr. et al. | 264/297.7 |
| 6,900,547 B2 | | 5/2005 | Polk Jr. et al. | 257/777 |
| 7,208,219 B2 | | 4/2007 | Polk, Jr. et al. | 428/292.1 |
| 2005/0040552 A1 | | 2/2005 | Gemberling | 264/40.1 |

* cited by examiner

*Primary Examiner* — Robert B Davis
*Assistant Examiner* — Thukhanh Nguyen
(74) *Attorney, Agent, or Firm* — Allen, Dyer, Doppelt, Milbrath & Gilchrist, P.A

(57) ABSTRACT

A molding apparatus includes a bottom platen, a bottom mold portion carried by the bottom platen, and a top platen overlying the bottom platen and the bottom mold portion. The top platen includes slots extending therethrough for receiving a molding material. The molding material is to be gravity deposited into the bottom mold portion. A top mold portion is carried by the top platen and is moveable between a molding material loading position and an article forming position. An actuator is coupled to the top mold portion for moving the top mold portion between the molding material loading position and the article forming position. The molding material loading position corresponds to when the top mold portion is non-overlying the bottom mold portion so that the molding material can be gravity deposited therein. The article forming position corresponds to when the top mold portion is overlying the bottom mold portion for molding an article.

24 Claims, 3 Drawing Sheets

GRAVITY INJECTION OF MOLDING MATERIAL FOR COMPRESSION MOLDING AND RELATED METHODS

RELATED APPLICATION

This is a divisional patent application of U.S. patent application Ser. No. 12/123,564 filed May 20, 2008, now U.S. Pat. No. 7,931,845, the entire disclosure of which is hereby incorporated herein by reference.

This application claims the benefit of U.S. Provisional Application Ser. No. 60/939,155 filed May 21, 2007, the entire contents of which are incorporated herein By reference.

FIELD OF THE INVENTION

The present invention relates to the field of molding, and more particularly, to compression molding.

BACKGROUND OF THE INVENTION

In compression molding, a lump or slab of preheated thermoplastic material may be pressed between two matched mold halves that compress the thermoplastic material into a desired part or shape. The mold is closed and pressure is applied to force the thermoplastic material into contact throughout the mold, and heat and pressure are maintained until the thermoplastic material has cured. The process employs thermosetting resins in a partially cured stage, either in the form of granules, putty-like masses, or preforms.

Compression molding is a high-volume, high-pressure method suitable for molding complex, high-strength fiberglass reinforcements. Advanced composite thermoplastics can also be compression molded with unidirectional tapes, woven fabrics, randomly orientated fiber mat or chopped strands. The advantage of compression molding is its ability to mold large, fairly intricate parts. Compression molding produces fewer knit lines and less fiber-length degradation than injection molding.

However, a disadvantage of compression molding is that a high capital investment is required to purchase high capacity presses capable of providing 2000-3000 tons of pressure, and high-pressure molds. This is really only efficient for large production volumes. Lower volumes of smaller parts can be manufactured using aluminum molds on existing presses to save some cost. Other disadvantages of the process are low fiber fractions due to viscosity problems.

An alternative to compression molding is disclosed in U.S. Pat. No. 6,900,547 in which gravity injection of thermoplastic material is used in the compression molding process. In particular, the thermoplastic material is gravitated onto a bottom half of a mold as it is moving toward a stationary top half of the mold. The '547 patent is hereby incorporated herein by reference in its entirety.

In U.S. Pat. No. 6,126,433 a molding material is plasticized in an extruder unit and is introduced into a compression mold unit by an injection unit. The extruder and one or more injection units are independent units arranged on a coordinate table. The extruder and injection units can be separated from and joined to one another such that one or more injection units can be releasably coupled to an extruder unit, then uncoupled from the extruder unit and moved toward one or more compression molding units. Because the injection unit can be uncoupled from the extruder, only the significantly lower mass of the injection unit has to be moved in order to deposit the thermoplastic material inside the mold.

Even in view of the various alternatives to compression molding, there is still a need to improve this process.

SUMMARY OF THE INVENTION

In view of the foregoing background, it is therefore an object of the present invention to simplify compression molding for molding articles.

This and other objects, advantages and features in accordance with the present invention are provided by a molding apparatus comprising a bottom platen, and a bottom mold portion carried by the bottom platen. A top platen may overlie the bottom platen and the bottom mold portion, and includes at least one slot extending therethrough for receiving a molding material. The molding material may be gravity deposited into the bottom mold portion.

A top mold portion may be carried by the top platen and may be moveable between a molding material loading position and an article forming position. An actuator may be coupled to the top mold portion for moving the top mold portion between the molding material loading position and the article forming position. The molding material loading position corresponds to when the top mold portion is non-overlying the bottom mold portion so that the molding material can be gravity deposited therein. The article forming position corresponds to when the top mold portion is overlying the bottom mold portion for molding an article.

Since the molding material is spread out over the bottom mold portion while the top mold portion is spaced therefrom, this significantly reduces the amount of pressure needed for completion of the article being molded. As a result, the complexity and cost of the top and bottom mold portions are significantly reduced.

The molding apparatus may further comprise a press for pressing the bottom platen and the bottom mold portion towards the top mold portion for molding the article. Alternatively, the press may press the top platen and the top mold portion towards the bottom mold portion for molding the article. The bottom mode portion may be stationary when the top mold portion is in the molding material loading position and in the article forming position.

The at least one slot in the top platen may include a plurality of slots. At least one of the slots in the plurality of slots may be partitioned from the other slots. The plurality of slots may have different sizes.

Another aspect of the present invention is directed to a method for molding an article using a molding apparatus as described above. The method comprises moving the top mold portion to a molding material loading position, with the molding material loading position corresponding to when the top mold portion is non-overlying the bottom mold portion. The molding material may be injected into the at least one slot extending through the top platen so that the molding material is gravity deposited in the bottom mold portion. The top mold portion may be moved from the molding material loading position to an article forming position, with the article forming position corresponding to when the top mold portion is overlying the bottom mold portion. The method further comprises pressing the bottom and top mold portions together for molding the article.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
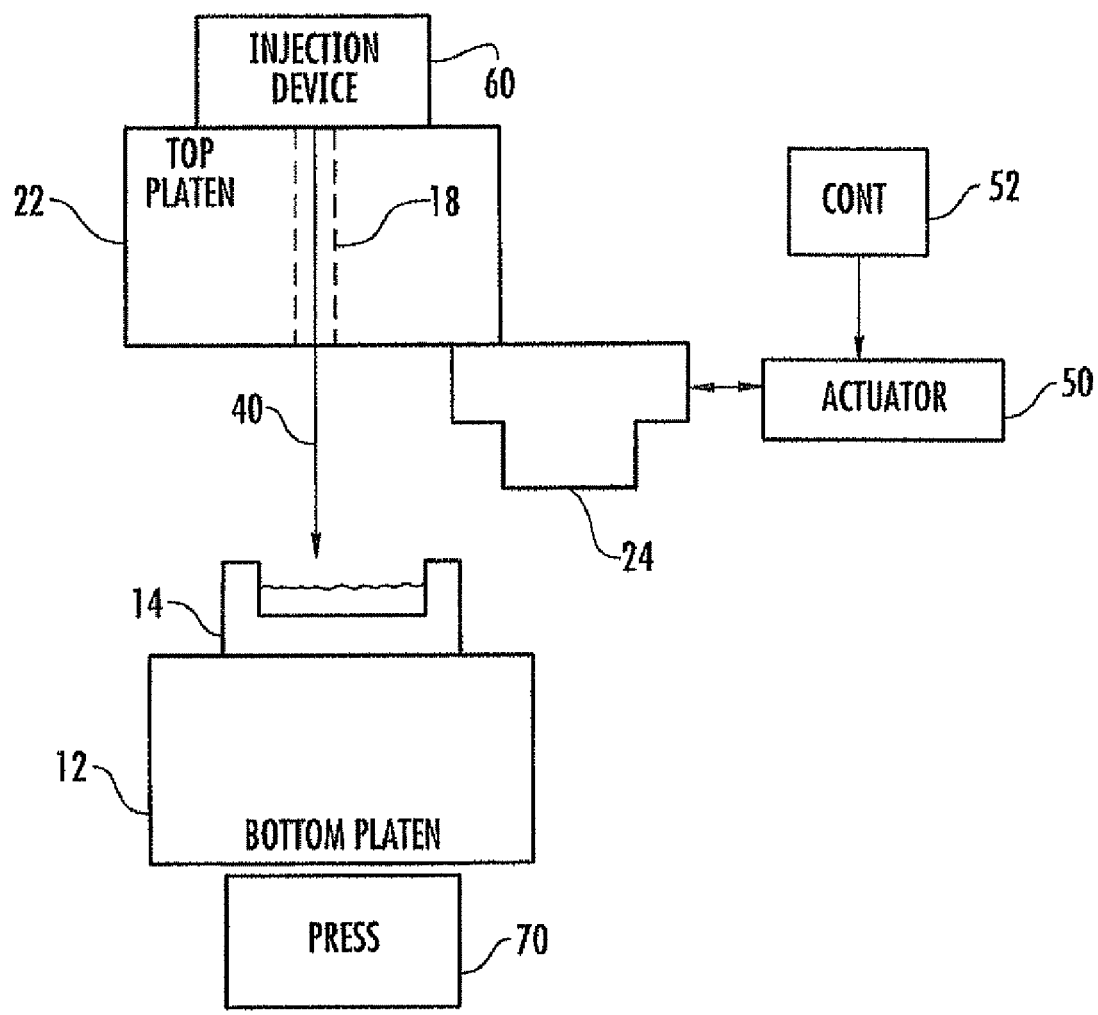
FIG. 1 is a block diagram of a molding apparatus with the top mold portion in a molding material loading position so that molding material can be gravity deposited into the bottom mold portion in accordance with the present invention.
Figure 2:
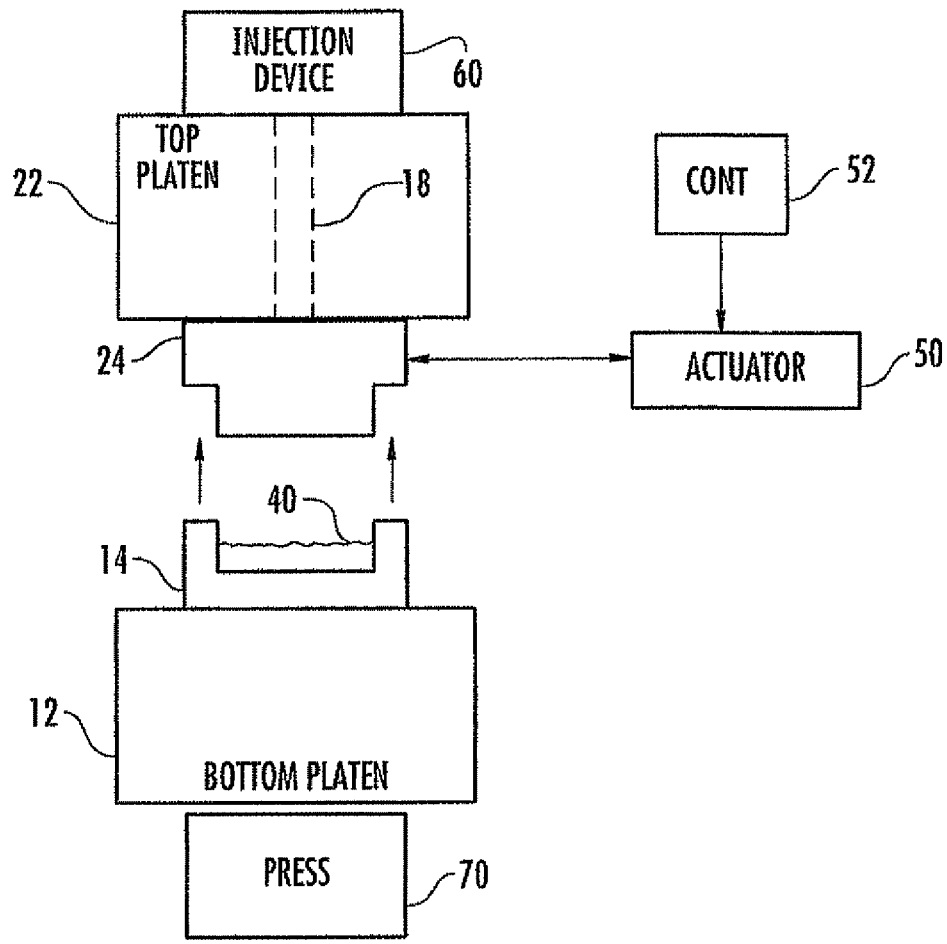
FIG. 2 is a block diagram of the molding apparatus shown in FIG. 1 with the top mold portion in an article forming position so that an article can be molded.

Referring initially to FIGS. 1 and 2, a molding apparatus 10 for molding an article includes a bottom platen 12, and a bottom mold portion 14 carried by the bottom platen. A top platen 22 overlies the bottom platen 12 and the bottom mold portion 14. The top platen 22 includes at least one slot 30 extending therethrough for receiving a molding material 40. The molding material 40 is to be gravity deposited into the bottom mold portion 14.

The molding material 40 may comprise a thermoplastic material or a thermosetting material, as readily appreciated by those skilled in the art. The molding material may be based on a polymer or elastomer. The polymers may also be fiber-reinforced.

A top mold portion 24 is carried by the top platen 22 and is moveable between a molding material loading position and an article forming position. An actuator 50 is coupled to the top mold portion 24 for moving or shuttling the top mold portion between the molding material loading position and the article forming position. The molding material loading position corresponds to when the top mold portion 24 is non-overlying the bottom mold portion 14 so that the molding material 40 can be gravity deposited therein. The article forming position corresponds to when the top mold portion 24 is overlying the bottom mold portion 14 for molding the article.

Since gravity depositing the molding material 40 allows it to spread out over the bottom mold portion 14 while the top mold portion 24 is spaced therefrom, this significantly reduces the amount of pressure needed for completion of the article being molded. As a result, the complexity and cost of the top and bottom mold portions 14, 24 are significantly reduced.

Movement of the top mold portion 24 is provided by the actuator 50. The top mold portion 24 is to be moved to allow clearance of the at least one slot 18 extending through the top platen 22. The actuator 50 responds to a control signal provided by a controller 52. Operation of the actuator 50 may be based on a piston, for example. Alternatively, pneumatics or hydraulics may be used to control movement of the top mold portion 24.

An injection device 60 injects the molding material 40 into the at least one slot 18 in the top platen 22. Once the proper amount of molding material 40 has been injected, a suction device is used to pull back any excessive molding material 40. Deposit of the molding material 40 from the top platen 22 into the bottom mold portion 14 is based on gravity. The bottom mold portion 14 is stationary when the top mold portion 24 is in the molding material loading position or in the article forming position.

After the molding material 40 has been gravity deposited into the bottom mold portion 14, the top mold portion 24 is moved by the actuator 44 so that it is in alignment with the bottom mold portion. The top and bottom mold portions 14, 24 are then pressed together to mold the article.

The molding apparatus 10 further comprises a press 70 adjacent the bottom platen 12 for pressing the bottom platen 12 and the bottom mold portion towards the top mold portion 24 for molding the article. Alternatively, a press may be adjacent the top platen 22 for pressing the top platen and the top mold portion 24 towards the bottom mold portion for molding the article.

Figure 3:
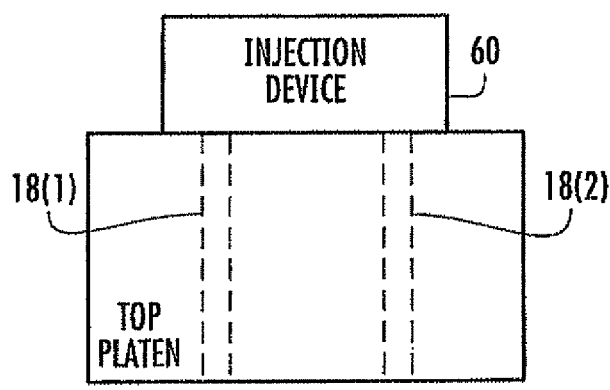
FIG. 3 is a side view of the top platen with a plurality of slots extending therethrough in accordance with the present invention.

Another feature of the molding apparatus 10 is that the at least one slot 18 in the top platen 12 is configured to include a plurality of slots 18(1) and 18(2), as illustrated in FIG. 3. The slots may be partitioned. By partitioning the slots, this advantageously allows selected placement of the molding material 40 into the bottom mold portion 14. Selected placement advantageously allows the thickness of the molding material 40 to be varied in the bottom mold portion 14.

In addition, the slots 18(1) and 18(2) can be sized differently from one another if the molding material 40 is to include fiber. Different size slots can be used for reducing fiber breakage for large size fibers. Reference is directed to U.S. Pat. No. 7,208,219 disclosing a molded thermoplastic material comprising a fibrous material embedded in a thermoplastic resin matrix. The length and characteristics of the fibrous material along with the thermoplastic resin are discussed in greater detail in the '219 patent, which is hereby incorporated herein by reference in its entirety.

Figure 4:
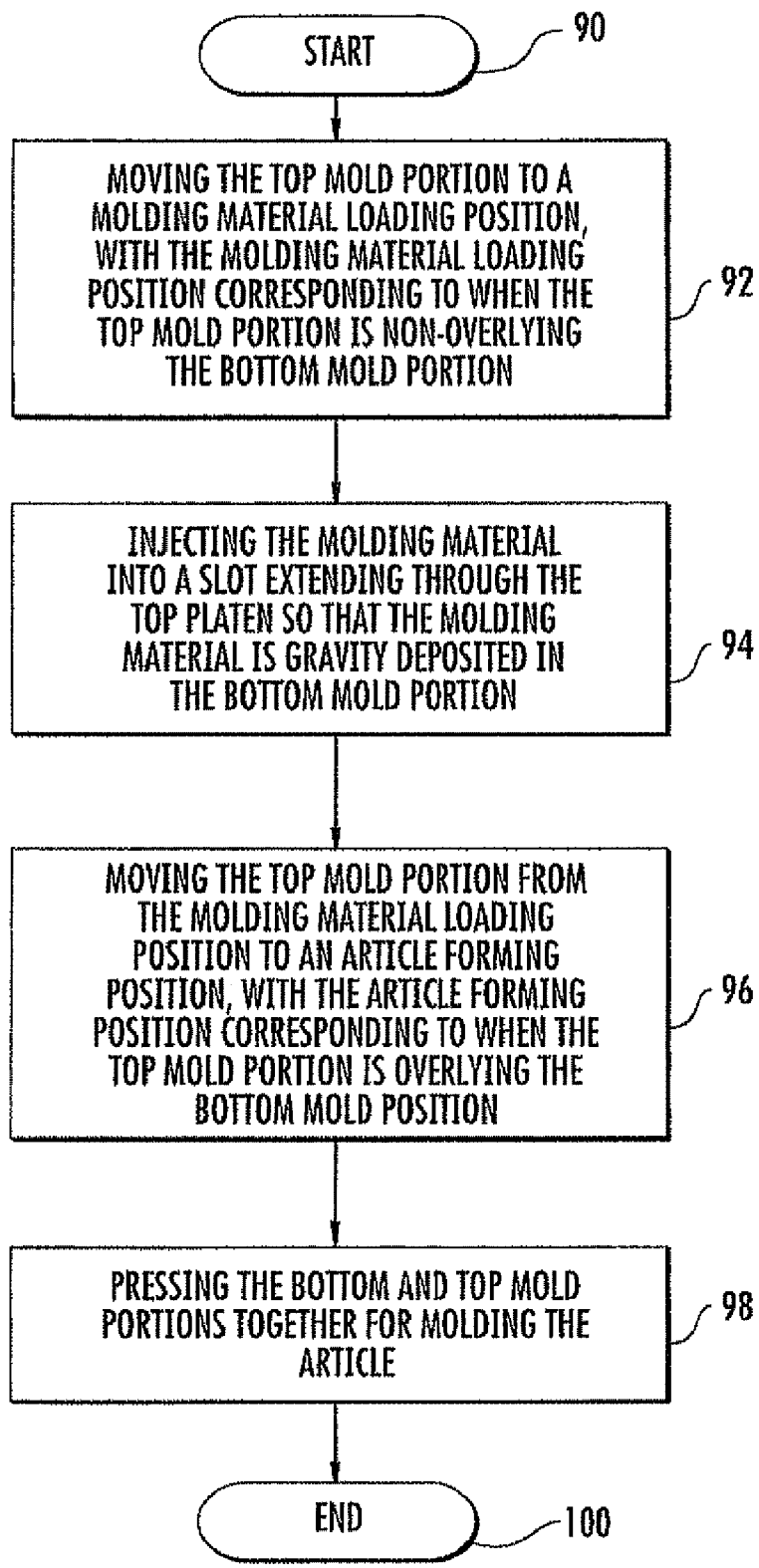
FIG. 4 is a flow chart illustrating a method for molding an article in accordance with the present invention.

Another aspect of the present invention is directed to a method for molding an article using a molding apparatus as described above. Referring now to FIG. 4, and from the start (Block 90), the method comprises moving the top mold portion 24 to a molding material loading position at Block 92, with the molding material loading position corresponding to when the top mold portion 24 is non-overlying the bottom mold portion 14. The molding material 40 is injected into at least one slot 18 extending through the top platen 22 so that the molding material is gravity deposited in the bottom mold portion 14 at Block 94. The top mold portion 24 is moved at Block 96 from the molding material loading position to an article forming position, with the article forming position corresponding to when the top mold portion 24 is overlying the bottom mold portion 14. The bottom and top mold portions 14, 24 are pressed together at Block 98 for molding the article. The method ends at Block 100.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included as readily appreciated by those skilled in the art.

That which is claimed:

1. A molding apparatus comprising:
    a bottom platen;
    a bottom mold portion carried by said bottom platen;
    a top platen overlying said bottom platen and said bottom mold portion, and including at least one slot extending therethrough for receiving a molding material, the molding material to be gravity deposited into said bottom mold portion;

a top mold portion carried by said top platen and moveable between a molding material loading position and an article forming position; and an actuator coupled to said top mold portion for moving said top mold portion between the molding material loading position and the article forming position, with the molding material loading position corresponding to when said top mold portion is non-overlying said bottom mold portion so that the molding material can be gravity deposited therein, and with the article forming position corresponding to when said top mold portion is overlying said bottom mold portion for molding an article.

2. The molding apparatus according to claim 1 further comprising a press for pressing said bottom platen and said bottom mold portion towards said top mold portion for molding the article.

3. The molding apparatus according to claim 1 further comprising a press for pressing said top platen and said top mold portion towards said bottom mold portion for molding the article.

4. The molding apparatus according to claim 1 wherein said bottom mode portion is stationary when said top mold portion is in the molding material loading position and in the article forming position.

5. The molding apparatus according to Claim 1 wherein said actuator comprises a piston.

6. The molding apparatus according to claim 1 wherein the at least one slot in said top platen includes a plurality of slots.

7. The molding apparatus according to claim 6 wherein at least one of the slots in the plurality of slots is partitioned from the other slots.

8. The molding apparatus according to claim 6 wherein the plurality of slots have different sizes.

9. The molding apparatus according to claim 1 wherein the molding material comprises a thermoplastic material.

10. The molding apparatus according to claim 1 wherein the molding material comprises a thermosetting material.

11. The molding apparatus according to claim 1 wherein the molding material comprises a polymer.

12. The molding apparatus according to claim 11 wherein the polymer comprises fiber.

13. A molding apparatus comprising:
a bottom platen;
a bottom mold portion carried by said bottom platen;
a top platen overlying said bottom platen and said bottom mold portion, and including at least one slot extending therethrough for receiving a molding material, the molding material to be gravity deposited into said bottom mold portion;
a top mold portion carried by said top platen and moveable between a molding material loading position and an article forming position; and
an actuator coupled to said top mold portion for moving said top mold portion between the molding material loading position and the article forming position, with
the molding material loading position corresponding to when said top mold portion is non-overlying said bottom mold portion so that the molding material can be gravity deposited therein, and
the article forming position corresponding to said top platen carrying said top mold portion on an underside thereof while overlying said bottom mold portion and said bottom platen, with said bottom and top platens not being positioned between said bottom and top mold portions for molding an article.

14. The molding apparatus according to claim 13 further comprising a press for pressing said bottom platen and said bottom mold portion towards said top mold portion for molding the article.

15. The molding apparatus according to claim 13 further comprising a press for pressing said top platen and said top mold portion towards said bottom mold portion for molding the article.

16. The molding apparatus according to claim 13 wherein said bottom mode portion is stationary when said top mold portion is in the molding material loading position and in the article forming position.

17. The molding apparatus according to claim 13 wherein said actuator comprises a piston.

18. The molding apparatus according to claim 13 wherein the at least one slot in said top platen includes a plurality of slots.

19. The molding apparatus according to claim 18 wherein at least one of the slots in the plurality of slots is partitioned from the other slots.

20. The molding apparatus according to claim 18 wherein the plurality of slots have different sizes.

21. The molding apparatus according to claim 13 wherein the molding material comprises a thermoplastic material.

22. The molding apparatus according to claim 13 wherein the molding material comprises a thermosetting material.

23. The molding apparatus according to claim 13 wherein the molding material comprises a polymer.

24. The molding apparatus according to claim 23 wherein the polymer comprises fiber.

* * * * *